United States Patent
Villa et al.

(10) Patent No.: US 6,727,479 B2
(45) Date of Patent: Apr. 27, 2004

(54) INTEGRATED DEVICE BASED UPON SEMICONDUCTOR TECHNOLOGY, IN PARTICULAR CHEMICAL MICROREACTOR

(75) Inventors: Flavio Villa, Milan (IT); Gabriele Barlocchi, Cornaredo (IT); Manlio Gennaro Torchia, Catanzaro (IT); Ubaldo Mastromatteo, Bareggio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/128,989

(22) Filed: Apr. 22, 2002

(65) Prior Publication Data

US 2003/0057199 A1 Mar. 27, 2003

(Under 37 CFR 1.47)

Related U.S. Application Data

(63) Continuation-in-part of application No. 09/874,382, filed on Jun. 4, 2001.

(30) Foreign Application Priority Data

Apr. 23, 2001 (IT) ...................................... TO2001A0392

(51) Int. Cl.[7] ............................ H05B 3/02; H05B 3/06; C12M 1/36; C12M 1/34
(52) U.S. Cl. ..................... 219/521; 219/201; 219/385; 219/530; 435/286.1; 435/287.2
(58) Field of Search ............................... 219/200, 201, 219/385, 521, 530; 422/63, 81; 435/286.1, 286.5, 287.1, 287.2

(56) References Cited

U.S. PATENT DOCUMENTS

| | | | |
|---|---|---|---|
| 4,993,143 A | | 2/1991 | Sidner et al. ............... 29/621.1 |
| 5,498,392 A | | 3/1996 | Wilding et al. ............. 422/68.1 |
| 5,639,423 A | * | 6/1997 | Northrup et al. ......... 435/286.5 |
| 5,856,174 A | * | 1/1999 | Lipshutz et al. .......... 435/286.5 |
| 5,882,903 A | * | 3/1999 | Andrevski et al. ............. 422/63 |
| 5,928,880 A | | 7/1999 | Wilding et al. ............. 435/7.21 |
| 5,932,100 A | | 8/1999 | Yager et al. ................. 210/634 |
| 5,955,028 A | * | 9/1999 | Chow .......................... 422/63 |
| 6,040,193 A | | 3/2000 | Winkler et al. ............. 436/180 |
| 6,057,149 A | * | 5/2000 | Burns et al. ............. 435/287.2 |
| 6,071,478 A | * | 6/2000 | Chow .......................... 422/81 |
| 6,132,580 A | * | 10/2000 | Mathies et al. .......... 435/286.1 |
| 6,211,598 B1 | * | 4/2001 | Dhuler et al. ................ 310/307 |
| 6,271,021 B1 | * | 8/2001 | Burns et al. ............. 435/287.2 |

FOREIGN PATENT DOCUMENTS

| | | | | |
|---|---|---|---|---|
| EP | WO0205946 A1 | * | 1/2002 | ............ B01J/19/00 |
| WO | WO 96/15576 | | 5/1996 | |
| WO | WO 98/25701 | | 6/1998 | |
| WO | WO 00/23190 | | 4/2000 | |

OTHER PUBLICATIONS van den Berg et al., "Modular Concept for Miniature Chemical Systems," DECHEMA *Monographs* vol. 132: 109–123, 1996.

Arkilic et al., "Gaseous Slip Flow in Long Microchannels," *Journal of Microelectronical Systems* 6(2):167–178, Jun. 1997.

The World Leader of Photoepoxiesin the MEMES World, URL = http://dmtwww.epfl.ch/~lguerin/SU8NF.html, download date of Sep. 23, 1999.

* cited by examiner

*Primary Examiner*—Joseph Pelham
(74) *Attorney, Agent, or Firm*—Jenkens & Gilchrist

(57) ABSTRACT

An integrated device based upon semiconductor technology, in particular a chemical microreactor, including a semiconductor body having a high-temperature operating portion and a low-temperature operating portion. The semiconductor body is provided with a thermal-insulation device including a dissipator element arranged between the high-temperature operating portion and the low-temperature operating portion. The dissipator includes a membrane connecting the high-temperature operating portion and the low-temperature operating portion, and a plurality of diaphragms that extend substantially orthogonal to the membrane and are parallel to one another.

32 Claims, 5 Drawing Sheets

INTEGRATED DEVICE BASED UPON SEMICONDUCTOR TECHNOLOGY, IN PARTICULAR CHEMICAL MICROREACTOR

CROSS-REFERENCE TO RELATED APPLICATION

This application is a continuation-in-part of U.S. patent application Ser. No. 09/874,382, filed Jun. 4, 2001, now pending, which application is incorporated herein by reference in its entirety.

BACKGROUND OF THE INVENTION

1. Field of the Invention

The present invention relates to an integrated device based upon semiconductor technology, in particular a chemical microreactor.

2. Description of the Related Art

As is known, proper operation of numerous devices is dependent upon precise regulation of the operating temperature. This may involve difficulties, especially when the devices, for optimizing performances, or simply for reducing the overall dimensions, must be integrated on a single chip of semiconductor material also comprising devices that dissipate high powers. In this case, in fact, the problem arises of thermally insulating the regions in which the power devices are formed, which are at a high temperature, from the regions that must be kept at a controlled temperature.

For example, the treatment of some fluids involves an increasingly precise temperature regulation, in particular when chemical or biochemical reactions are involved. In addition, frequently the need is felt to use very small amounts of fluid since the fluid is costly and not always readily available.

This is, for example, the case of the process of DNA amplification (polymerase chain reaction process, or PCR process) in which precise temperature control in the various phases (repeated preset thermal cycles are required), the need to avoid as far as possible thermal gradients where the fluid is made to react (so that in these areas there may be a uniform temperature), and also the quantity of fluid used (which is very costly) are of crucial importance for obtaining good reaction efficiency or even for obtaining the reaction itself.

Other examples of treatment of fluids having the characteristics indicated above are, for instance, linked to the performance of chemical and/or pharmacological analyses, biological tests, etc.

At present, various techniques exist that enable thermal control of chemical or biochemical reagents. A first technique uses a reactor comprising a glass or plastic base on which a biological fluid is deposited by means of a pipette. The base rests on a hot-plate called "thermo-chuck", which is controlled by external instrumentation.

Another known reactor comprises a heater, controlled by appropriate instrumentation and on which a biological fluid to be examined is deposited. The heater is supported by a base which also carries a sensor that is arranged in the immediate vicinity of the heater and is also connected to the instrumentation for temperature regulation, so as to enable precise temperature control.

Both types of reactors are often enclosed in a protective casing.

A common disadvantage of the known reactors described lies in the large thermal mass of the system; consequently, they are slow and have high power absorption. For example, in the case of the PCR process mentioned above, times of about 6–8 hours are required.

Another disadvantage of known solutions is that, given the macroscopic dimensions of the reactors, they are able to treat only relatively high volumes of fluids (i.e., minimum volumes of the order of milliliters).

The disadvantages referred to above result in very high treatment costs (in the case of the aforementioned PCR process, the cost can amount to several hundreds of dollars); in addition, they restrict the range of application of known reactors to test laboratories alone.

In order to overcome the above-mentioned drawbacks, starting from the late eighties miniaturized devices have been developed, and hence ones of reduced thermal mass, which are able to reduce the times required for completing the DNA-amplification process.

The first of these devices is described in the article by M. A. Northrup, M. T. Ching, R. M. White, and R. T. Watson, "DNA amplification with a microfabricated reaction chamber", *Proc. 1993 IEET Int. Conf Solid-State Sens. Actuators*, pp. 924–926, 1993, and comprises a cavity formed in a substrate of monocrystalline silicon by anisotropic etching. The bottom of the cavity comprises a thin silicon-nitride membrane, on the outer edge of which heaters of polycrystalline silicon are present. The top part of the cavity is sealed with a glass layer. Thanks to its small thermal mass, this structure can be heated at a rate of 15° C./sec., with cycle times of 1 minute. With this device it is possible to carry out, for a volume of fluid of 50 $\mu$l, twenty amplification cycles in periods approximately four times shorter than those required by conventional thermocyclers and with a considerably lower power consumption.

However, the process described (as others currently used based upon bonding two silicon substrates pre-formed by anisotropic etches in KOH, TMAH, or other chemical solutions) is costly, has high critical aspects and low productivity, and is not altogether compatible with the usual steps of fabrication applied in microelectronics.

Other more recent solutions envisage forming, inside a first wafer of semiconductor material, buried channels connected to the surface via inlet and outlet trenches, and of reservoirs formed in a second wafer of semiconductor material by anisotropic etching, and bonding together the two wafers.

Also this solution, however, is disadvantageous in that the process is costly, critical, has low productivity, and requires the use of a glass paste containing lead (so-called "glass frit") for bonding the two wafers together.

The problem of thermal insulation may also regard sensors or actuators comprising micro-electromechanical systems (MEMS), which sometimes must be integrated with power devices. In these cases, insulation is required both in order to prevent subjecting the micro-electromechanical structures to dangerous thermal stresses, and because the efficiency and precision of the devices are linked to the presence of well-determined operating conditions.

BRIEF SUMMARY OF THE INVENTION

Aspects of the invention include the an integrated device based upon semiconductor technology as a chemical microreactor. Aspects further include a semiconductor body having a high-temperature operating portion and a low-temperature operating portion, and thermal-insulation means. The thermal-insulation means comprise dissipator means arranged between said high-temperature operating portion and said low-temperature operating portion. The dissipator means comprise a membrane connecting said high-temperature operating portion and said low-temperature operating portion, and a plurality of diaphragms extending from said membrane.

Other features and advantages of the invention will become apparent from the following detailed description, taken in conjunction with the accompanying drawings.

BRIEF DESCRIPTION OF THE SEVERAL VIEWS OF THE DRAWINGS

In order to better understand the present invention, embodiments thereof will now be described, purely by way of non-limiting example, with reference to the attached drawings, in which.

DETAILED DESCRIPTION OF THE INVENTION

Figure 1:
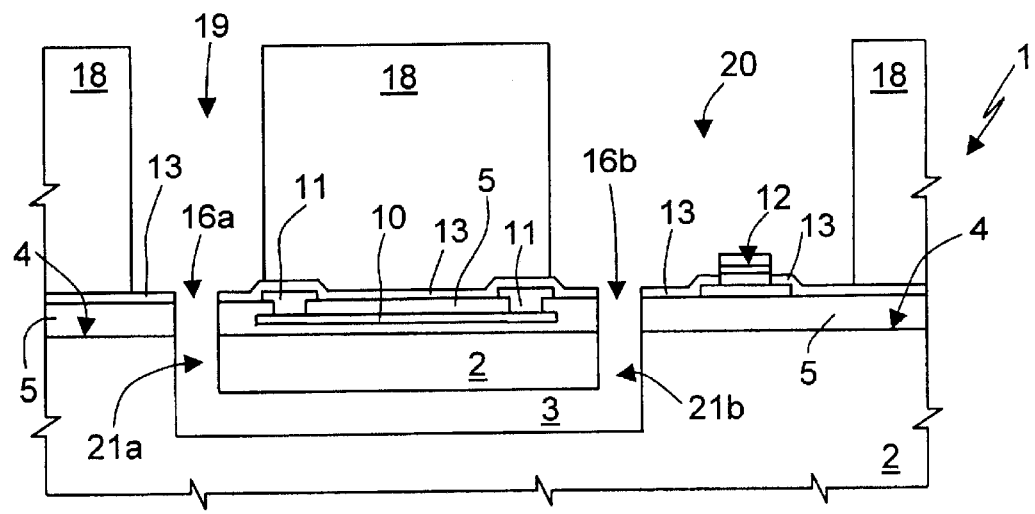
FIG. 1 shows a longitudinal cross-section of an integrated device.
Figure 2:
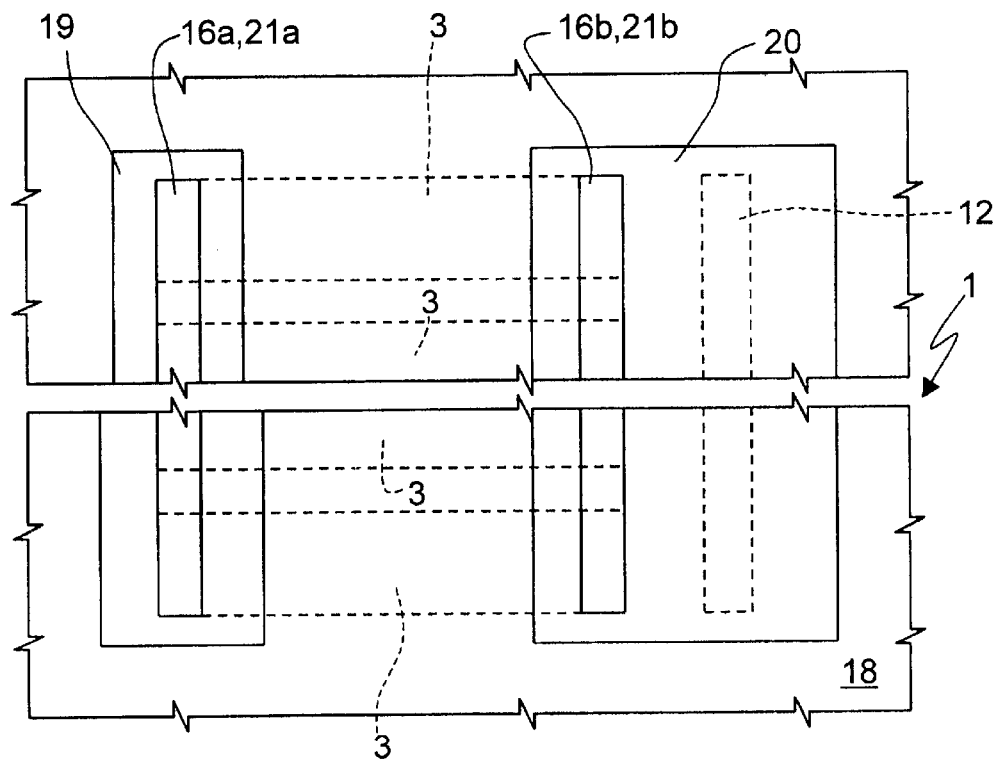
FIG. 2 is a top plan view of the device of FIG. 1.

An example of a chemical microreactor integrated in a single chip of semiconductor material will be briefly described in what follows with reference to FIGS. 1 and 2.

In detail, FIG. 1 shows a chemical microreactor comprising a semiconductor body 2, typically of monocrystalline silicon, in which buried channels 3 are formed that extend parallel to a surface 4 of the semiconductor body 2. Preferably, as indicated in the top view of FIG. 2 by dashed lines, a plurality of buried channels 3 extend parallel to one another at short distances apart. In this case, the buried channels 3 may have an approximately circular or rectangular section and are arranged at a distance of 50 $\mu$m from one another and at a depth of 20–30 $\mu$m from the surface 4. When the buried channels 3 have a rectangular cross section, the shorter side measures approximately 30 $\mu$m, and the longer side approximately 200 $\mu$m, while the length of the channels is 10 mm, and the total area occupied is 50 mm$^2$. Alternatively, it is possible to have a single channel, approximately 10 mm in length, approximately 5 mm in width, and approximately 20 $\mu$m in height. In both cases, a total volume is obtained of approximately 1 mm$^3$ (1 $\mu$l).

A first insulating layer 5, for example of silicon dioxide, extends on the surface 4 of the semiconductor body 2 and a polycrystalline-silicon heating element 10 is formed inside the insulating layer 5. Preferably, the heating element 10 extends substantially over the area occupied by the buried channels 3, but not over the longitudinal ends of the buried channels 3, where an inlet opening 16a and an outlet opening 16b for the channels 3 are formed. The inlet opening 16a and outlet opening 16b preferably have a length of approximately 5 mm (in a direction perpendicular to the plane of the drawing) and a width of approximately 60 $\mu$m. Access trenches 21a and 21b extend aligned to the inlet and outlet openings 16a, 16b, from the surface 4 as far as the channels 3, so as to connect the channels 3 to one another in parallel, as well as to an inlet reservoir 19 and an outlet reservoir 20, as explained hereinafter.

Contact regions 11, for example of aluminum, extend through openings of the first insulating layer 5 and are in electrical contact with two opposite ends of the heating element 10 to enable passage of electric current through the heating element 10 and heating of the underlying area.

A sensing electrode 12 extends over the first insulating layer 5, laterally staggered with respect to the buried channels 3, and is made up of a multilayer, for example of aluminum, titanium, nickel and gold, in a per se known manner and hence not described in detail herein.

A second insulating layer 13, for example of TEOS (tetra-ethyl orthosilicate) oxide extends on top of the first insulating layer 5 and has an opening through which the sensing electrode 12 protrudes.

The inlet reservoir 19 and the outlet reservoir 20 are formed inside a resist layer 18 that overlies the second insulating layer 13. In particular, and as is shown in the top view of FIG. 2, in which the channels 3 are represented by dashed lines, the outlet reservoir 20 is formed as an extension of the outlet opening 16b (and hence is connected to the ends of the channels 3 close to the sensing electrode 12) and leaves the sensing electrode 12 uncovered. The inlet reservoir 19 is formed, instead, as an extension of the inlet opening 16a, and is thus connected to the opposite end of the channels 3. Preferably, the reservoirs 19, 20 have a length (in a direction perpendicular to the plane of FIG. 1) of approximately 6 mm; the inlet reservoir 19 has a width (in a horizontal direction in FIG. 1) of between 300 $\mu$m and 1.5 mm, preferably approximately 1 mm, so as to have a volume of at least 1 mm$^3$, and the outlet reservoir 20 has a width of between 1 and 4 mm, preferably of approximately 2.5 mm.

Preferably, the resist layer 18 is formed by a negative resist having a thermal conductivity of between 0.1 and 1.4 W/m K and a coefficient of thermal expansion CTE$\leq$50 ppm/°K, such as the material known under the name "SU8" (Shell Upon 8) produced by SOTEC MICROSYSTEMS. For example, the resist layer 18 has a thickness of between 300 $\mu$m and 1 mm, preferably 500 $\mu$m.

The microreactor 1, however, has limits of use due to the absence of thermal insulation between the heater 10 and the region where the sensing electrode 12 is formed. In many cases, in fact, the fluid contained in the outlet reservoir 20 must be kept at a controlled temperature considerably lower than the temperature of the fluid that is inside the channels 3. In particular, a considerable difference in temperature, for example of about 40–50° C., must be kept between the heater 10 and the region in which the sensing electrode 12 is made. However, the high thermal conductivity of silicon enables the heat generated by the heater 10 to propagate practically throughout the chip in which the microreactor 1 is formed, and consequently it is not possible to obtain the required temperature difference.

Figure 3:
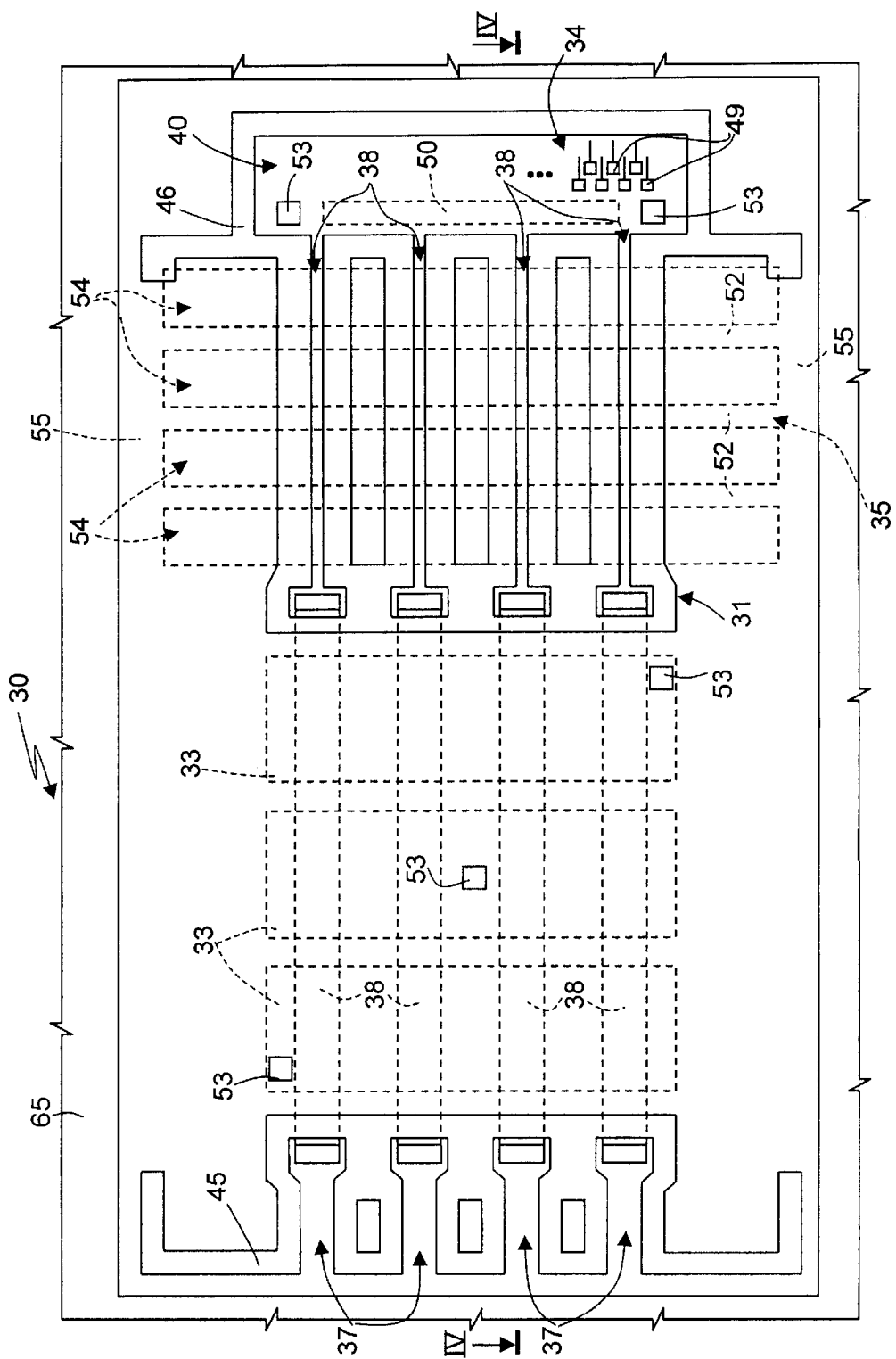
FIG. 3 is a top plan view of an integrated device according to a first embodiment of the present invention.
Figure 4:
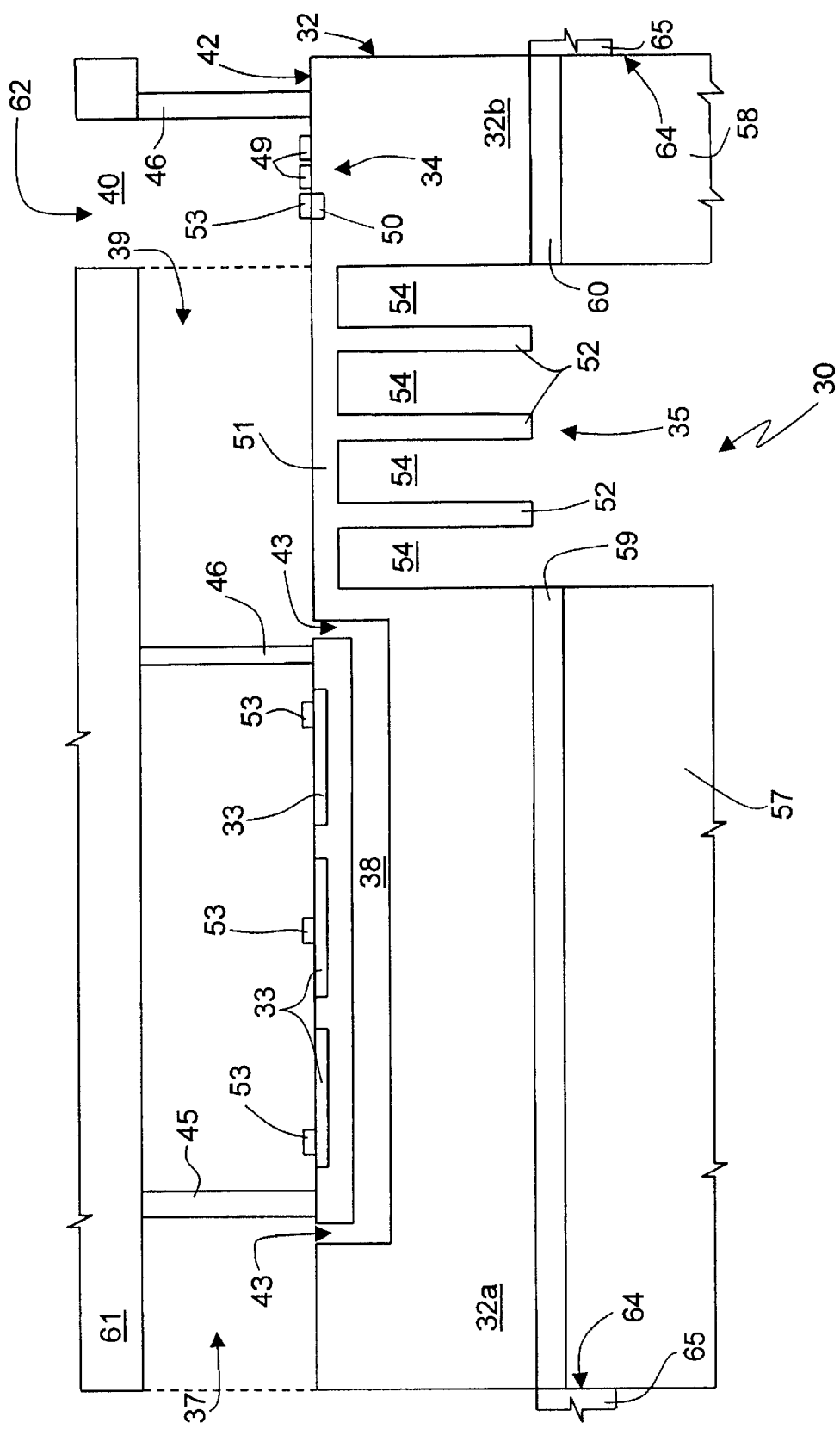
FIG. 4 is a side view of the integrated device of FIG. 3, according to a cross-sectional plane IV—IV of FIG. 3.

With reference to FIGS. 3 and 4, number 30 designates, as a whole, a chemical microreactor for molecular diagnostics integrated in a die. For simplicity, hereinafter reference will be made to a device of this type; this must not, however, be considered in any way limiting, in so far as the invention may also be applied to different devices.

The microreactor 30 comprises a hydraulic circuit 31, which is partially formed inside a semiconductor body 32, typically of monocrystalline silicon and having a thickness of approximately 600–700 $\mu$m (for example, 670 $\mu$m), a plurality of heating elements 33, a sensing device 34, and a dissipator element 35.

The hydraulic circuit 31 comprises a plurality of inlet openings 37 for receiving capillaries (not illustrated) through which a fluid containing chemical reagents is introduced, buried channels 38, and outlet ducts 39 ending in an outlet reservoir 40. In greater detail, the buried channels 38 are formed inside the semiconductor body 32 and extend parallel to and at a distance from a surface 42 of the semiconductor body 32. In addition, each of the buried channels 38 is connected to a respective inlet opening 37 and to a respective outlet duct 39 through access trenches 43, so as to form a duct that extends longitudinally with respect to the semiconductor body 32. The inlet openings 37 on one side and the outlet ducts 39 and the outlet reservoir 40 on the other are defined in a first resist structure 45 and, respectively, in a second resist structure 46, which are both formed on top of the surface 42 of the semiconductor body 32. Preferably, the resist is SU8 and has a thickness of between 300 $\mu$m and 500 $\mu$m, for example 400 $\mu$m.

The heating elements 33, of polycrystalline silicon, are embedded inside the semiconductor body 32, in the proximity of the surface 42, and are electrically insulated from the semiconductor body 32 in a per se known manner and not illustrated in detail. In a preferred embodiment of the invention, there are three heating elements 33, which are arranged transversely above the buried channels 38 and are spaced at equal distances. A first portion 32a of the semiconductor body 32, which houses the heating elements 33 and the buried channels 38, forms a portion at a high-temperature operating.

The sensing device 34 comprises a plurality of sensing electrodes 49, which are arranged on the bottom of the outlet reservoir 40, and an outlet heating element 50, which is also embedded in the semiconductor body 32, in the proximity of the surface 42. A second portion 32b of the semiconductor body 32, which carries the sensing device 34, forms a portion at a low-temperature operating.

A plurality of temperature sensors 53 (for example, five), of a known type, are arranged in proximity of the heating elements 33 and, preferably, in proximity of opposite ends of the outlet heating element 50.

According to the invention, the dissipator element 35 is made in the semiconductor body 32, between the first portion 32a at a high-temperature operating and the second portion 32b at a low-temperature operating. In particular, the dissipator element 35 comprises a membrane 51, having a thickness of approximately 10–15 $\mu$m, arranged underneath the outlet ducts 39, so as to connect the first portion 32a and the second portion 32b, and extends transversely practically throughout the length of the semiconductor body 32; and a plurality of diaphragms 52, extending orthogonally to the membrane 51 and parallel to one another. The diaphragms 52, which have a rectangular or trapezoidal cross-section, are separated from one another and from the portions 32a, 32b of the semiconductor body 32 by thermal-insulation trenches 54, and are joined laterally by two opposite walls 55. The thermal-insulation trenches 54 have, in plan view, a substantially rectangular shape and have a length of approximately 400 $\mu$m and a width of approximately 10–12 mm.

Preferably, the microreactor 1 also comprises a first metal dissipator 57 and a second metal dissipator 58 of known type. In particular, the first metal dissipator 57 is connected, through a first interface layer 59, to the first portion 32a of the semiconductor body 32, on a surface not facing the surface 42; and the second metal dissipator 58 is connected to the second portion 32b of the semiconductor body 32 through a second interface layer 60. The interface layers 59, 60 may be of the same material or of different materials; for example, the first interface layer 59 is of Kapton and the second interface layer 60 is of a material known as "FR5".

A protective layer 61, for example of polycarbonate, is bonded on top of the first structure 45 and second structure 46, and practically overlies the entire surface 42 of the semiconductor body 32, except for an opening 62 above the outlet reservoir 40. In this way, the protective layer 61 covers and closes at the top the inlet openings 37 and the outlet ducts 39 of the hydraulic circuit 31, while the outlet reservoir 40 is uncovered to enable extraction of the fluid at the end of the chemical process.

The microreactor 1 is housed in and bonded to a through seat 64 of a supporting plate 65, of plastic material (for example, FR5). In particular, the semiconductor body 31, the structures 45, 46, and the protective layer 61 protrude from a first face of the supporting plate 65, while the metal dissipators 57, 58 protrude from a second face, not facing the first face.

During use, the heating elements 33 bring the first portion 32a of the semiconductor body 32 up to a first operating temperature, for example approximately 90° C., and keep it at this temperature, so as to heat the fluid present in the buried channels 38 and to activate the chemical process. The outlet heating element 50 keeps the sensing device 34 and the second portion 32b of the semiconductor body 32 at a second operating temperature, for example approximately 50° C.

The dissipator element 35 thermally decouples the first portion 32a and the second portion 32b from each other, preventing the heat generated by the heating elements 33 from propagating as far as the sensing device 34. In fact the membrane 51, of silicon, has high thermal conductivity but a small thickness (10–15 $\mu$m), and consequently, as a whole, high thermal resistance. In addition, the diaphragms 52 have the function of cooling fins, increasing the heat-exchange surface and favoring heat dissipation into the environment. The metal dissipators 57, 58 contribute to further improving heat dissipation, thus enabling optimal operating conditions to be achieved.

The diaphragms 52 also have an important mechanical function of supporting the membrane 51, which otherwise would be too brittle and easily subject to failure. The diaphragms 52, which are connected between the side walls 55, prevent bending of the membrane 51 both in the longitudinal direction and in the transverse direction.

Figure 5:
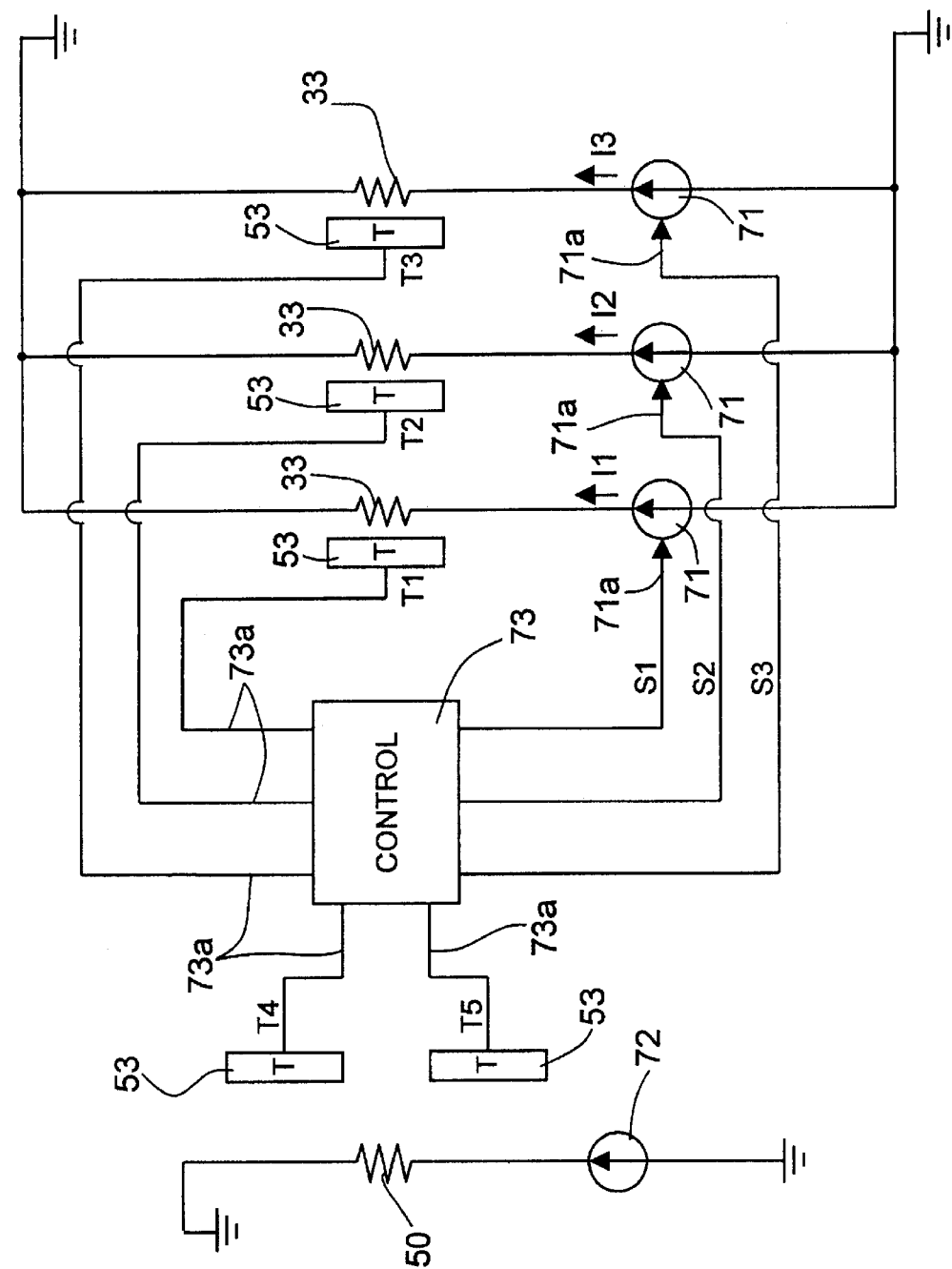
FIG. 5 is a simplified circuit diagram of one part of the integrated device of FIG. 3.

According to a further aspect of the invention, the heating elements 33 are activated separately, as shown in FIG. 5. In particular, the heating elements 33 are here schematically represented by resistors, each of which is connected between ground and a respective controlled current source 71. The controlled current sources 71 supply the heating elements 33 with respective currents I1, I2, I3. FIG. 5 also illustrates the outlet heating element 50, which is also schematically represented as a resistor connected to a constant current source 72.

A control circuit 73, of known type, has a plurality of inputs 73a, each of which is connected to the output of a respective temperature sensor 53, and at least three outputs, each of which is connected to a control terminal 71a of a respective controlled current source 71. The temperature sensors 53 supply the control circuit 73 with respective electrical temperature signals T1–T5. According to the temperature electrical signals T1–T5, the control circuit 73 generates and supplies the control terminals 71a of the controlled current sources 71 with respective control signals S1, S2, S3 for separately and independently controlling the values of the currents I1, I2, I3 supplied to the heating elements 33. In this way it is possible to heat in a uniform way the first portion 32a of the semiconductor body 32 and, in particular, the area of the buried channels 38.

The described integrated device has the following advantages. First, the integrated dissipator element provides good thermal insulation between areas to be kept at considerably different operating temperatures. This is particularly important in case of continuous operation of the device.

The use of the diaphragms 52 is particularly advantageous. In fact, in addition to increasing the heat-exchange surface, and thus the ability of dispersing heat, the diaphragms 52 have the function of mechanically supporting the membrane 51, which consequently is unlikely to be subject to failure, as discussed previously. It is therefore possible to make membranes with a thickness of a few micron, and with a somewhat high thermal resistance.

A further advantage lies in the fact that the integrated device may be made entirely employing the usual process steps that are used in microelectronics, and is therefore simple and economical to build.

Figure 6:
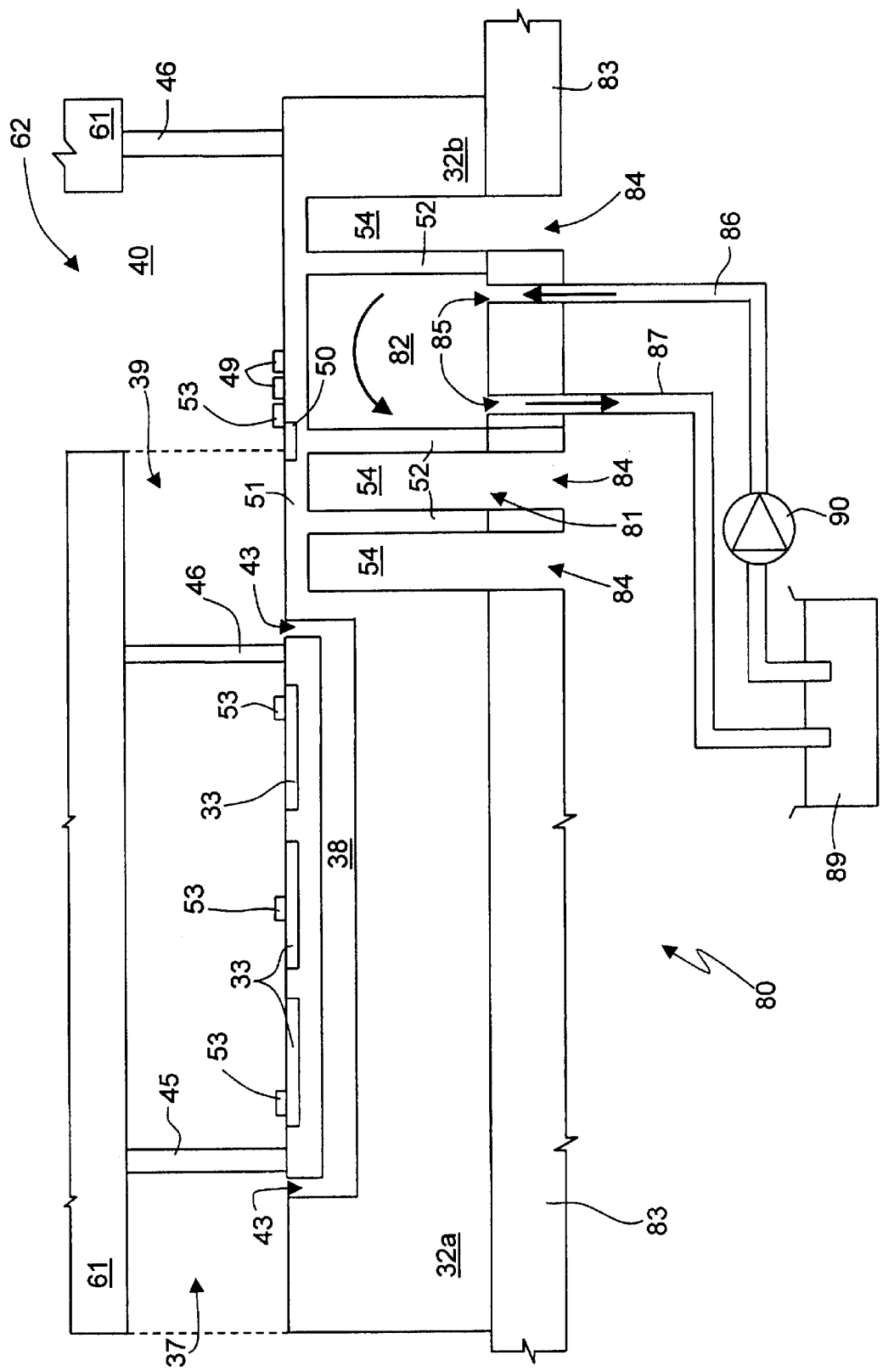
FIG. 6 is a cross-sectional view of an integrated device according to a second embodiment of the present invention.

A second embodiment of the invention will be described hereinafter with reference to FIG. 6, in which parts that are the same as the ones already shown are designated by the same reference numbers.

According to said embodiment, a chemical microreactor 80 comprises the hydraulic circuit 31, the heating elements 33, the sensing device 34, the polycarbonate protective layer 61, and a dissipator element 81.

In this case, the dissipator element 81 comprises, in addition to the membrane 51, the diaphragms 52, and the thermal-insulation trenches 54, also a cooling chamber 82, defined between two adjacent diaphragms 52 that are arranged at a distance of, for example, 700 μm. The cooling chamber 82, which is filled with a coolant (typically water), and at least one of the thermal insulation trenches 54 are made underneath the outlet reservoir 40. Furthermore, the sensing electrodes 49 and the outlet heating element 50 of the sensing device 34 are made above the membrane 51.

The microreactor 80 is bonded on a supporting plate 83, for instance of FR5, which delimits at the bottom the cooling chamber 82. The supporting plate 83 is provided with first through openings 84, which enable circulation of air in the thermal-insulation trenches 54, and second through openings 85 for connecting the cooling chamber 82 to a delivery capillary 86 and a return capillary 87, which are in turn connected to a thermostatted reservoir 89, in which the coolant is basically kept at a constant temperature. A pump 90 takes the coolant from the thermostatted reservoir 89 and sends it to the cooling chamber 82 through the delivery capillary 86. In this way, the coolant is continuously circulated between the cooling chamber 82, where it absorbs the heat that is propagated by the heating elements 33 through the membrane 51, and the thermostatted reservoir 89, where the heat absorbed is dissipated.

In addition to the advantages already described in connection with the microreactor 30 of FIGS. 3 and 4, the chemical microreactor 80 of FIG. 6 has reduced overall dimensions and weight, in so far as the dissipator device 81, which is more efficient, is formed in part beneath the outlet reservoir 40. In addition, again on account of the greater efficiency of the dissipator device 81, it is not necessary to use auxiliary metal dissipators.

Finally, it is clear that numerous modifications and variations may be made to the integrated devices described herein, without thereby departing from the scope of the present invention.

First of all, the invention can be applied also to devices other than chemical microreactors. In particular, it is possible to build, using MEMS technology, various types of micromotors, micro-actuators and sensors (for example, accelerometers or pressure sensors) in which a microstructure and devices with high power dissipation must be fabricated inside a single semiconductor wafer.

In addition, modifications may also be made to the described chemical microreactor. For example, the number and shape of the diaphragms 52 and of the thermal-insulation trenches 54 may be different from what is illustrated. The circuit for control of the currents supplied to the heating elements 33 may be built in a different way. In particular, the outputs of the temperature sensors 53 can be connected directly to the control terminals 71a of the respective controlled current sources 71.

The hydraulic circuit 31 may be modified in order to enable manual introduction, by means of pipettes, of the fluid containing the reagents. In this case, instead of the inlet openings 37 it is possible to provide inlet reservoirs which have a substantially cylindrical shape, are open at the top, and are each connected to a respective buried channel 38.

All references cited, including the above identified journal article and patent application, to which reference has been made above is incorporated by reference herein in its entirety. From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An integrated device comprising a semiconductor body having a high-temperature operating portion, a low-temperature operating portion, and thermal-insulation means, said thermal-insulation means including dissipator means arranged between said high-temperature operating portion and said low-temperature operating portion.

2. The device according to claim 1, wherein said dissipator means includes a membrane connecting said high-temperature operating portion and said low-temperature operating portion, and a plurality of diaphragms extending from said membrane.

3. The device according to claim 2, wherein said diaphragms are substantially orthogonal to said membrane and are parallel to one another.

4. The device according to claim 2 wherein said diaphragms are separated from one another and from said high-temperature operating portion by thermal-insulation trenches.

5. The device according to claim 2, further comprising a cooling chamber configured to contain a coolant and defined, beneath said membrane, between two adjacent diaphragms.

6. The device according to claim 5 wherein said cooling chamber is in fluid connection with a thermostatted reservoir through circulating means for circulating said coolant between said cooling chamber and said thermostatted reservoir.

7. The device according to claim 6 wherein said cooling chamber is arranged at least partially beneath said low-temperature operating portion.

8. The device according to claim 1, further comprising a first auxiliary dissipator and a second auxiliary dissipator respectively connected to said high-temperature operating portion and to said low-temperature operating portion.

9. The device according to claim 1 wherein the operating portions are configured for a chemical microreactor.

10. The device according to claim 9, further comprising a plurality of heating elements for heating said high-temperature operating portion, said heating elements being activated separately and independently by respective current sources.

11. The device according to claim 10, further comprising a plurality of temperature sensors supplying respective electrical temperature signals wherein said current sources are controlled current sources having respective control terminals receiving respective control signals correlated to said electrical temperature signals.

12. The device according to claim 9, further comprising at least one hydraulic circuit including:
   at least one inlet opening;
   at least one outlet duct ending onto an outlet reservoir; and
   at least one buried channel extending inside said semiconductor body, parallel to and at a distance from a surface of said semiconductor body, said at least one buried channel being connected to said at least one inlet opening and to said at least one outlet duct.

13. The device according to claim 12 wherein said dissipator means are arranged beneath said at least one outlet duct.

14. An integrated device formed through microelectronic fabrication techniques, the integrated device comprising at least one microreactor, each of the at least one microreactors including:
   a body having a first portion, a second portion, and a mid-portion positioned between the first and second portions;
   a hydraulic circuit including:
      an inlet for receiving a fluid;
      a channel fluidly linked to the inlet and positioned in the first portion of the body;
      an outlet fluidly linked to the channel; and
      an outlet reservoir fluidly linked to the outlet;
   a heating element positioned in the first portion of the body and thermally linked to the channel; and
   a heat dissipator positioned in the mid-portion of the body and thermally linked to the outlet to substantially block propagation of heat from the heating element to the second portion of the body.

15. The integrated device of claim 14, further comprising an outlet heating element thermally linked to the outlet reservoir.

16. The integrated device of claim 14, further comprising a temperature sensor proximately located near the heating element.

17. The integrated device of claim 14 wherein the heat dissipator includes a membrane extending in the mid-portion of the body between the first and second portions.

18. The integrated device of claim 14 wherein the heat dissipator includes a plurality of diaphragms extending within the mid-portion of the body, the diaphragms separated from one another and separated from the first and second portions of the body by thermal-insulation trenches.

19. The integrated device of claim 18 wherein the diaphragms have a rectangular or trapezoidal cross-section.

20. The integrated device of claim 18 wherein the heat dissipator includes a membrane extending in the mid-portion of the body between the first and second portions and wherein the diaphragms structurally support the membrane.

21. The integrated device of claim 14, further comprising first and second dissipators connected to the first and second portions of the body, respectively.

22. The integrated device of claim 14, further comprising a protective layer overlying a surface of the body except for an opening above the outlet reservoir.

23. The integrated device of claim 14 wherein the heating element is electrically connected to a controlled current source.

24. The integrated device of claim 14, further including a thermostated reservoir wherein the heat dissipator includes a cooling chamber fluidly linked to the thermostated reservoir.

25. The integrated device of claim 14 wherein the inlet includes at least one of the following: inlet openings and inlet reservoirs.

26. The integrated device of claim 14 wherein the outlet has an outlet duct.

27. The integrated device of claim 14 wherein the body is a semiconductor body.

28. An integrated device formed through microelectronic fabrication techniques, the integrated device comprising:
   a body having a first portion, a second portion, and a mid-portion positioned between the first and second portions;
   a heat source positioned in the first portion of the body; and
   a heat dissipator positioned in the mid-portion of the body to substantially block propagation of heat from the at least one heat source to the second portion of the body.

29. The integrated device of claim 26 wherein the heat source is at least one of the following: a micromotor and a micro-actuator.

30. The integrated device of claim 26, further comprising a heat sensitive device position in the second portion.

31. The integrated device of claim 28 wherein the heat sensitive device is a sensing device.

32. The integrated device of claim 29 wherein the heat sensitive device is at least one of the following: an accelerometer and a pressure sensor.

* * * * *